United States Patent
Burdick (12)

(10) Patent No.: US 6,590,470 B1
(45) Date of Patent: Jul. 8, 2003

(54) CABLE COMPENSATOR CIRCUIT FOR CCD VIDEO PROBE

(75) Inventor: Kenneth J. Burdick, Skaneateles, NY (US)

(73) Assignee: Welch Allyn, Inc., Skaneateles Falls, NY (US)

( * ) Notice: Subject to any disclaimer, the term of this patent is extended or adjusted under 35 U.S.C. 154(b) by 588 days.

(21) Appl. No.: 09/592,345

(22) Filed: Jun. 13, 2000

(51) Int. Cl.[7] .............................. H03H 7/30; A61B 17/36

(52) U.S. Cl. ................... 333/28 R; 356/241.1; 600/109

(58) Field of Search ................. 333/28 R; 356/241.1; 600/109

(56) References Cited

U.S. PATENT DOCUMENTS 4,608,606 A * 8/1986 Levine ..................... 358/213
5,300,068 A * 4/1994 Rosar et al. ................ 606/34

* cited by examiner

Primary Examiner—Robert Pascal
Assistant Examiner—Stephen Jones
(74) Attorney, Agent, or Firm—Wall Marjama & Bilinski LLP

(57) ABSTRACT

Picture noise in a CCD video probe is reduced by producing a faithful reproduction of a reset-gate signal received from a timing generator to an imager by using a cable compensator network. The network contains an RLC circuit which corrects the relative amplitude and phase of the various frequency components of the reset-gate signal. The precise values of the components in the RLC circuit are selected according to the attenuation and distortion characteristics of the coaxial cable connecting the drive electronics assembly from the imager assembly.

18 Claims, 5 Drawing Sheets

1 Volt per Division
10 ns per Division

1 Volt per Division
10 ns per Division

CABLE COMPENSATOR CIRCUIT FOR CCD VIDEO PROBE

FIELD OF THE INVENTION

The invention pertains to the field of CCD video probes, and in particular to long borescopes or similar medical devices that have long cables coupling the drive electronics assembly to the imager assembly.

BACKGROUND OF THE INVENTION

CCD (charge coupled device) imagers require the use of a reset-gate pulse to discard charge from previous pixels before each succeeding pixel is read out from the imager. This signal is both attenuated and distorted as it passes through a coaxial cable, with the effect being stronger for long, small diameter cables such as used in borescopes. The distortion of the reset-gate pulse causes it to spread out in time. This spreading and reduced amplitude cause both fixed-pattern noise and random noise to appear in the picture. This results in a maximum usable length for a given imager/cable/image processing electronics system.

Non-linear amplifiers located near the imager can be used to regenerate the original waveform for the reset-gate. However, this approach does not eliminate all of the noise generating mechanisms, and incurs size penalties at the imager head. This is unacceptable for medical and other devices which must be kept small.

SUMMARY OF THE INVENTION

Briefly stated, picture noise in a CCD video probe is reduced by producing a faithful reproduction of a reset-gate signal received from a timing generator to an imager by using a cable compensator network. The network contains an RLC circuit which corrects the relative amplitude and phase of the various frequency components of the reset-gate signal. The precise values of the components in the RLC circuit are selected according to the attenuation and distortion characteristics of the coaxial cable connecting the drive electronics assembly from the imager assembly.

According to an embodiment of the invention, a cable compensator network which receives a reset-gate signal from a timing generator and provides the reset-gate signal to an imager includes an RLC circuit which receives the reset-gate signal from a buffer circuit and corrects a relative amplitude and phase of a plurality of frequency components of the reset-gate signal; and a low-pass filter which receives the reset-gate signal from the RLC circuit and outputs the reset-gate signal to the imager.

According to an embodiment of the invention, a cable compensator network which receives a reset-gate signal from a timing generator and provides the reset-gate signal to an imager includes correcting means for performing phase and relative amplitude correction of the received reset-gate signal, wherein the correcting means including means for boosting high frequency components of the received reset-gate signal, means for attenuating low frequency components of the received reset-gate signal, and means for limiting attenuation of middle frequency components of the reset-gate signal.

According to an embodiment of the invention, a method for reducing picture noise in a CCD video probe includes the steps of (a) receiving a reset-gate signal from a timing generator; (b) performing phase and relative amplitude correction of the received reset-gate signal; wherein the step of performing includes the steps of boosting high frequency components of the received reset-gate signal, attenuating low frequency components of the received reset-gate signal, and limiting attenuation of middle frequency components of the reset-gate signal; and (c) providing the corrected reset-gate signal to an imager in the CCD video probe.

DETAILED DESCRIPTION OF THE PREFERRED EMBODIMENT

Figure 1:
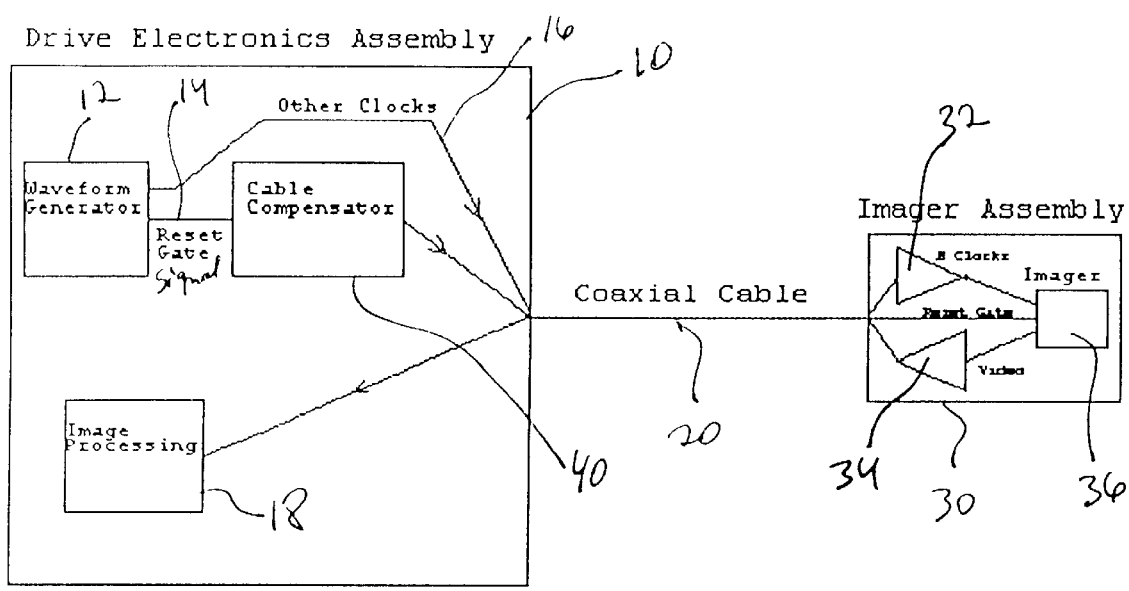
FIG. 1 shows a top level schematic of the present invention.

Referring to FIG. 1, a drive electronics assembly 10 is connected to an imager assembly 30 via a coaxial cable 20. Imager assembly 30 includes a horizontal clocks processing section 32, a video processing section 34, and an imager section 36. Sections 32 and 34 can be contained within imager assembly 30 because they don't add significantly to the size of imager assembly 30. That is, they don't contain any inductors or large capacitors. In borescope, bronchioscope, and angioscope applications, drive electronics assembly 10 is not contained in or co-located with imager assembly 30 due to the need to keep imager assembly 30 as small as possible to facilitate proper movement within the pipes, tubes, bronchia, or veins/arteries that these instruments are designed for.

Drive electronics assembly 10 includes a waveform generator 12 which provides a reset-gate signal 14 and other clock signals 16 to imager assembly 30. Drive electronics assembly 10 further includes an image processing circuit 18 that processes the signals received from imager assembly 30. Reset-gate signal 14 passes through a cable compensator 40 which corrects the relative amplitude and phase of the various frequency components of the reset-gate signal.

Figure 2:
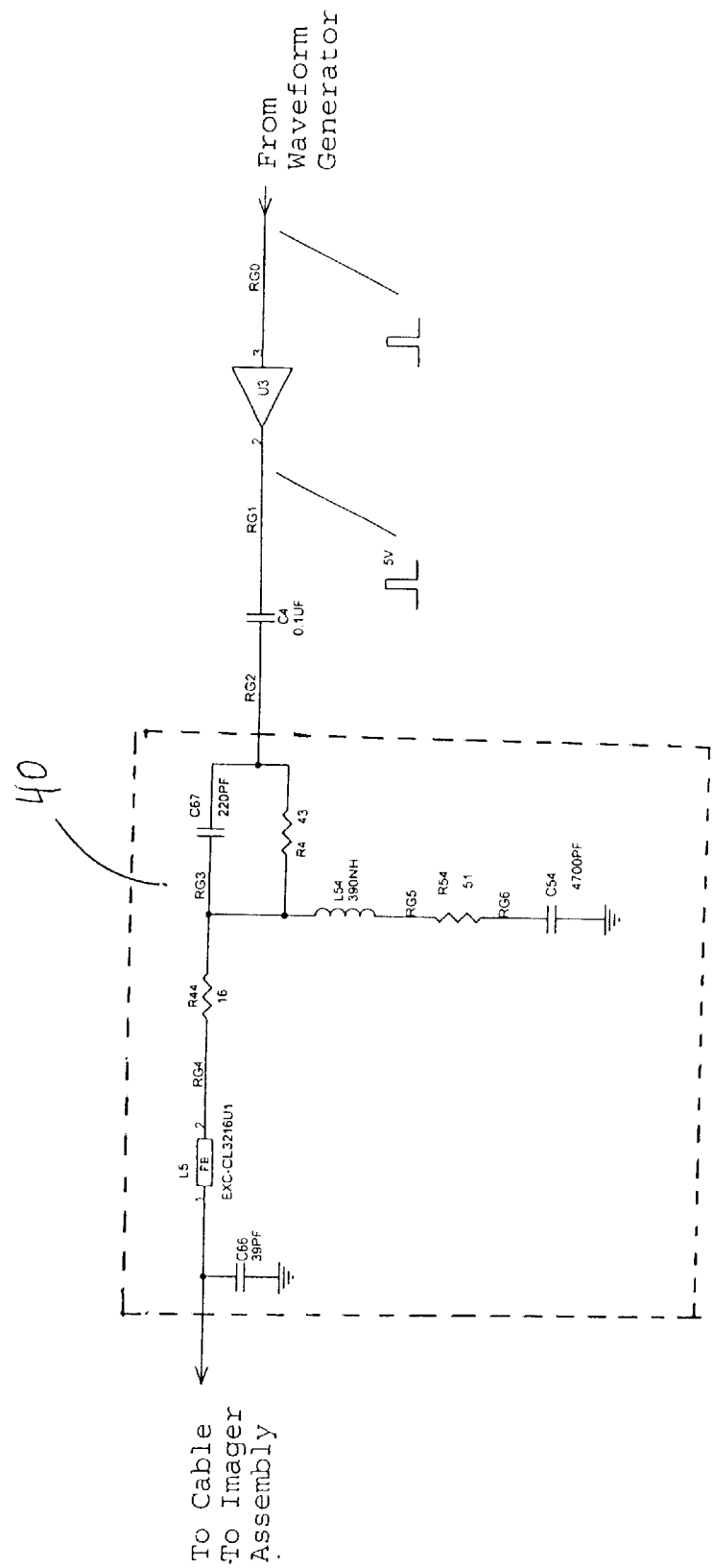
FIG. 2 shows a detailed schematic of an embodiment of the present invention.

Referring to FIG. 2, both the waveform generator 12 (FIG. 1) and the image processing circuit 18 (FIG. 1) are located in a separate assembly (not shown). In this embodiment, the reset-gate signal 14 passes through a buffer U3 and a DC blocking capacitor C4 before entering cable compensator 40 as signal RG2. In this case, the buffer U3 provides the necessary power to drive cable 20, but does not amplify reset-gate signal 14.

In essence, cable compensator 40 pre-distorts reset-gate signal 14 to compensate for the attenuation that occurs at different frequencies through cable 20. Cable compensator 40 includes capacitors C67, C54, C66; resistors R4, R44, R54; and inductors L54, L5. In this embodiment, R44, L5, and C66 form a low-pass filter end section that serves as part of the termination impedance for cable 20 as well as an EMI filter. R4, R44, and the output impedance of U3 provide low frequency termination impedance.

With a fundamental frequency of the reset-gate signal of 10–15 MHZ, this frequency range is considered to be "middle frequencies", with anything lower being a "low frequency" and anything higher being a "high frequency." The frequencies of particular concern for cable compensation are the fundamental frequency and the 2nd through 10th harmonics of the fundamental frequency. The primary components performing the relative phase and amplitude correction on reset gate signal 14 are series branch C67 and R44 and shunt branch L54, R54, and C54. C67 and L54 boost the amplitudes of the higher frequencies relative to the fundamental frequency. R44 and R54 limit the amount of boost from C67 and L54 respectively. R54 and C54 limit the attenuation that L54 causes at lower frequencies. At middle and high frequencies, C67, L54, L5, and C66 alter the matching impedance provided by R44 and R4. In this implementation, tradeoffs are made between matching impedance and other parameters so that the impedance at these frequencies is lower than ideal.

Figure 3:
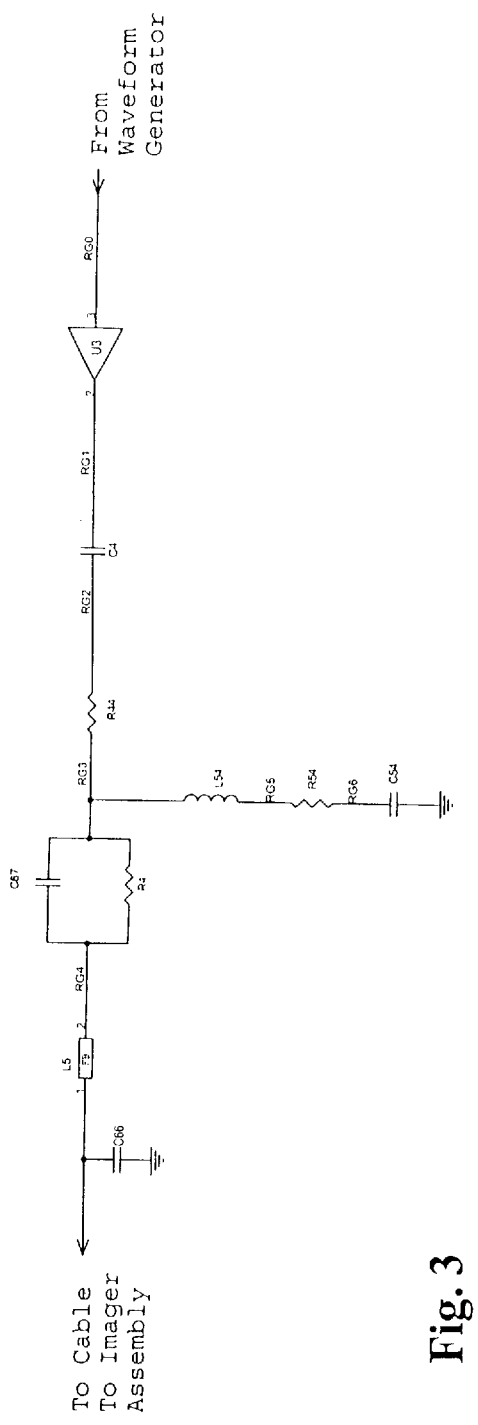
FIG. 3 shows a detailed schematic of an alternate embodiment of the present invention.

Referring to FIG. 3, an alternate embodiment is shown in which shunt branch L54, R54, and C54 are to the input side of the C67, R4 combination.

Figure 4:
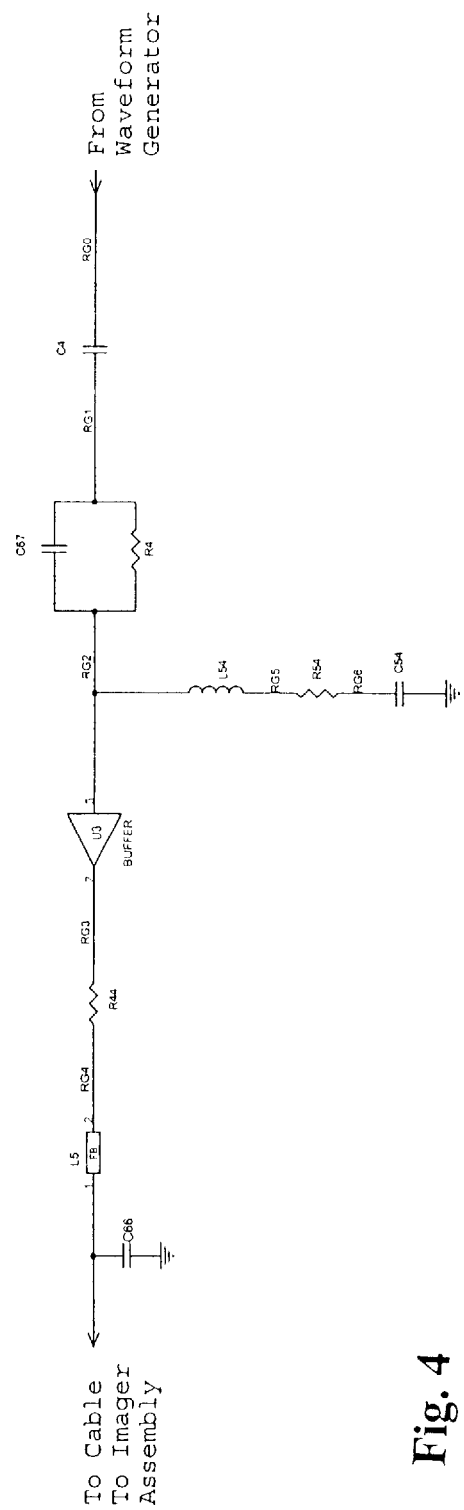
FIG. 4 shows a detailed schematic of an alternate embodiment of the present invention.

Referring to FIG. 4, an alternate embodiment is shown in which buffer U3 is after the "T"-section instead of before it. This embodiment permits obtaining an ideal matching impedance, but is more costly to implement.

Figure 5:
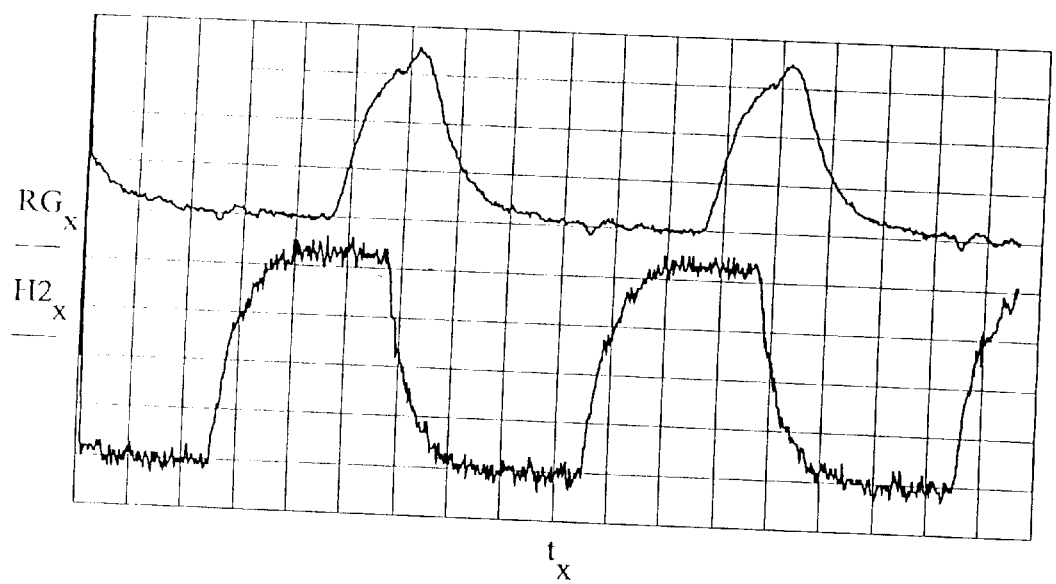
FIG. 5 shows an uncorrected reset-gate pulse measured at the head end as the pulse comes out of the cable.

Referring to FIG. 5, an uncorrected reset-gate pulse is shown measured at the head end (imager assembly end) of the borescope as the pulse comes out of cable 20. The H-clock pulse is also shown. Cable 20 is 10 meters long. The waveform shows a long undesired asymptote after the falling edges.

Figure 6:
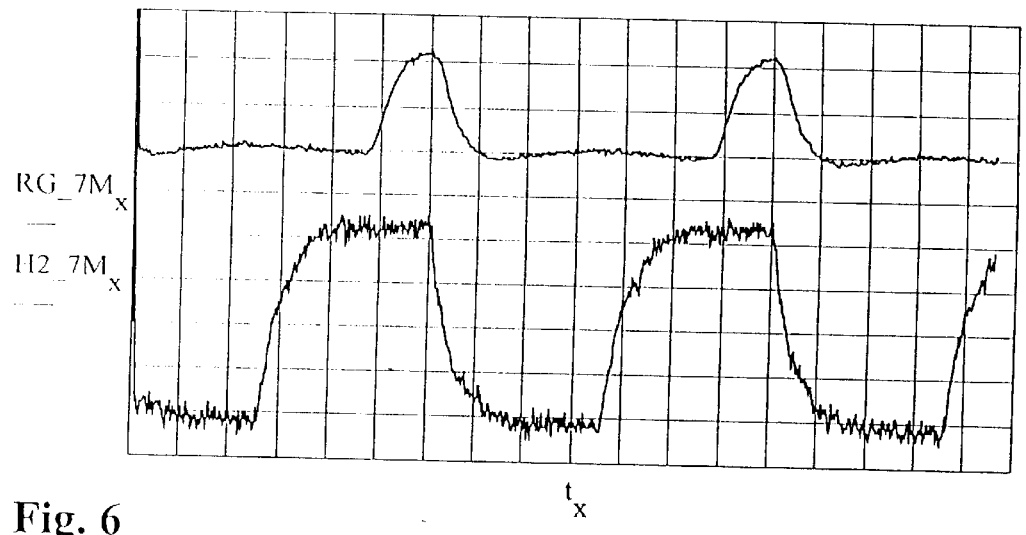
FIG. 6 shows a corrected reset-gate pulse measured at the head end as the pulse comes out of the cable.

Referring to FIG. 6, the corrected reset-gate pulse at the head end of the borescope after the pulse has been modified by cable compensator 40 is shown. Cable 20 is 10 meters long. The waveform falls promptly to the low level after the pulse.

Figure 7:
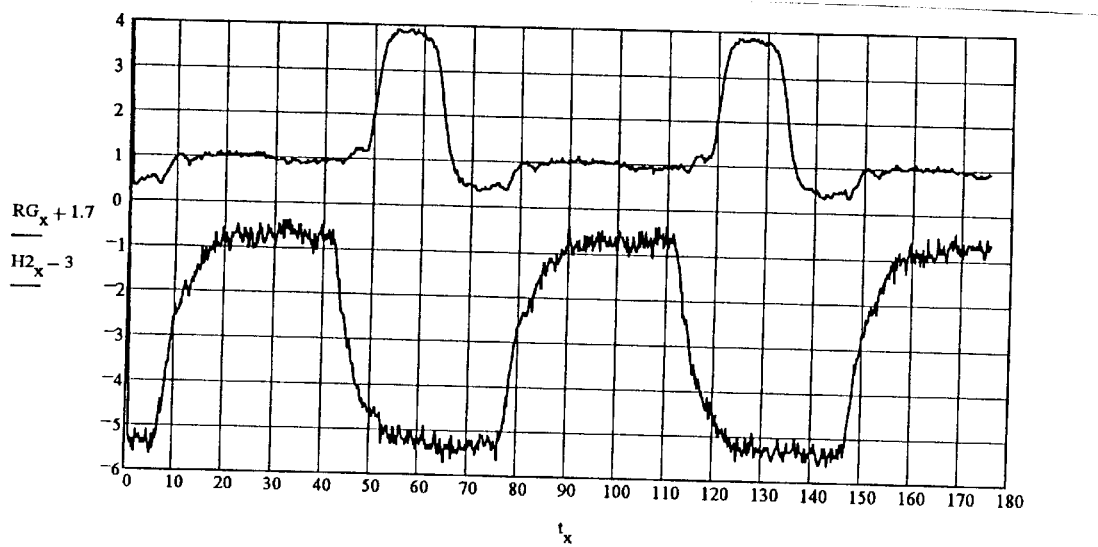
FIG. 7 shows a corrected reset-gate pulse measured at the head end as the pulse comes out of a shorter cable than that used for the measurement shown in FIG. 4.

Referring to FIG. 7, the corrected reset-gate pulse is shown when cable 20 is only 5 meters long. The waveform is nearly ideal except for a negative-going pulse that follows the main pulse. This is due to the non-ideal termination impedance of cable compensator 40, but is of no harm to its operation.

While the present invention has been described with reference to a particular preferred embodiment and the accompanying drawings, it will be understood by those skilled in the art that the invention is not limited to the preferred embodiment and that various modifications and the like could be made thereto without departing from the scope of the invention as defined in the following claims.

What is claimed is:

1. A cable compensator network which receives a reset-gate signal from a timing generator and provides said reset-gate signal to an imager, comprising:

an RLC circuit which corrects a relative amplitude and phase of a plurality of frequency components of said reset-gate signal; and a low-pass filter which receives said reset-gate signal from said RLC circuit and outputs said reset-gate signal to said imager.

2. A network according to claim 1, wherein said RLC circuit includes:

a first branch including a first capacitor in series with a first resistor and a first inductor;

a second branch including a second resistor in parallel with a second capacitor;

a third branch including a third resistor; and said first, second, and third branches being connected as a "T", with said first branch positioned as a shunt to a reference potential.

3. A network according to claim 2, wherein said low-pass filter includes:

a second inductor connected in series to said third resistor;

a third capacitor connected between said second inductor and said reference potential; and an output of said low-pass filter taken from between said second inductor and said third capacitor, said low-pass filter output being connected to said imager.

4. A network according to claim 3, further including a buffer and a fourth capacitor connected in series between said timing generator and said second branch.

5. A network according to claim 4, wherein said network is a component of one of a borescope, bronchioscope, and angioscope.

6. A network according to claim 2, wherein said third branch further includes a fourth capacitor in series with said third resistor.

7. A network according to claim 6, wherein said network is a component of one of a borescope, bronchioscope, and angioscope.

8. A network according to claim 2, wherein said third branch further includes a buffer in series with said third resistor.

9. A network according to claim 8, wherein said network is a component of one of a borescope, bronchioscope, and angioscope.

10. A network according to claim 1, wherein said network is a component of one of a borescope, bronchioscope, and angioscope.

11. A network according to claim 1, wherein said cable compensated by said network is at least 5 meters long.

12. A network according to claim 11, wherein said cable is 10 meters long.

13. A cable compensator network which receives a reset-gate signal from a timing generator and provides said reset-gate signal to an imager, comprising correcting means for performing phase and relative amplitude correction of said received reset-gate signal, wherein said correcting means boosts high frequency components of said received reset-gate signal relative to middle frequency components, limits attenuation of middle frequency components of said reset-gate signal, and passes low frequency components of said reset-gate signal.

14. A network according to claim 13, wherein said network is a component of one of a borescope, bronchioscope, and angioscope.

15. A network according to claim 13, further comprising means for filtering electromagnetic interference.

16. A network according to claim 15, wherein said network is a component of one of a borescope, bronchioscope, and angioscope.

17. A method for reducing picture noise in a CCD video probe that is a component of one of a borescope, bronchioscope, and angioscope, comprising the steps of:

receiving a reset-gate signal from a timing generator;

performing phase and relative amplitude correction of said received reset-gate signal; wherein the step of performing includes the steps of boosting high frequency components of said received reset-gate signal relative to middle frequency components, and limiting attenuation of middle frequency components of said reset-gate signal; and providing said corrected reset-gate signal to an imager in said CCD video probe.

18. A method according to claim 17, further including the step of passing low frequency components of said reset-gate signal to said imager.

* * * * *